United States Patent [19]

Varvello et al.

[11] Patent Number: 5,143,735
[45] Date of Patent: Sep. 1, 1992

[54] APPARATUS FOR PRODUCING CRISP LONG TERM PRESERVATION SMALL LOAVES

[75] Inventors: Angelo Varvello; Franco Varvello, both of Vigevano, Italy

[73] Assignee: Societe Des Produits Nestle S.A., Perugina, Italy

[21] Appl. No.: 433,796

[22] Filed: Apr. 27, 1989

Related U.S. Application Data

[60] Division of Ser. No. 205,004, Jun. 3, 1988, Pat. No. 4,849,230, and a continuation of Ser. No. 880,151, Jun. 30, 1986, abandoned.

[30] Foreign Application Priority Data

Jul. 1, 1985 [IT] Italy ................ 21392 A/85

[51] Int. Cl.⁵ .............................................. B29C 53/02
[52] U.S. Cl. ..................................... 425/220; 425/238; 425/319; 425/334; 425/364 R
[58] Field of Search .................... 426/27, 502; 99/353; 425/237, 374, 220, 101, 334, 238, 362, 319, 320, 321, 373, 363, 96, 364 R

[56] References Cited

U.S. PATENT DOCUMENTS

| Re. 17,711 | 6/1930 | Scruggs | 425/101 |
|---|---|---|---|
| 698,814 | 4/1902 | Chase et al. | 425/334 |
| 897,068 | 8/1908 | Diener | 425/101 |
| 1,295,024 | 2/1919 | Gosiewski | 425/96 |
| 1,582,382 | 4/1926 | Collis | 425/101 |
| 1,903,572 | 4/1933 | Schröder | 425/334 |
| 1,945,755 | 2/1934 | Scruggs, Jr. | 425/101 |
| 2,619,051 | 11/1952 | Rize | 425/238 |
| 2,746,401 | 5/1956 | Archer | 425/96 |
| 2,774,313 | 12/1956 | Lombi | 425/362 |
| 3,116,703 | 1/1964 | Enoch et al. | 425/334 |
| 3,302,592 | 2/1967 | Warner | 425/362 |
| 4,438,145 | 3/1984 | Bakker | 99/450.1 |
| 4,469,476 | 9/1984 | Cavanagh et al. | 425/362 |
| 4,666,391 | 5/1987 | Watt et al. | 425/334 |

FOREIGN PATENT DOCUMENTS

| 647399 | 7/1937 | Fed. Rep. of Germany | 425/362 |
|---|---|---|---|
| 4527384 | 7/1966 | Japan | 425/238 |
| 10940 | 5/1924 | Netherlands | 425/362 |

Primary Examiner—Jay H. Woo
Assistant Examiner—Robert B. Davis
Attorney, Agent, or Firm—Fitzpatrick, Cella, Harper & Scinto

[57] ABSTRACT

An apparatus for producing crisp, long term preservation, small loaves on an industrial scale including a forming machine having a feeder assembly, a molding station and a forming station laid sequentially to each other. The feeder assembly includes a plurality of parallel, sequentially-laid driven roll pairs, a gap between corresponding roll pairs decreasing in width from the most upstream roll pair to the most downstream roll pair. The molding station includes first and second counter rotating driven rolls, the first roll having a plurality of mold cavities uniformly distributed across its skirt, and the second roll having a smooth surface skirt, the rolls being mounted in pressure contact with each other. The forming station includes a folder device.

10 Claims, 4 Drawing Sheets

Fig-6

APPARATUS FOR PRODUCING CRISP LONG TERM PRESERVATION SMALL LOAVES

CROSS REFERENCE TO RELATED APPLICATIONS

This is a division of U.S. application Ser. No. 07/205,004 filed Jun. 3, 1988, now U.S. Pat. No. 4,849,230, issued Jul. 18, 1989, which in turn is a continuation of U.S. application Ser. No. 06/880,151, filed Jun. 30, 1986, abandoned.

BACKGROUND OF THE INVENTION

1. Field of the Invention

This invention relates to a breadmaking method for producing crisp, long term preservation, small loaves or buns on an industrial scale.

2. Description of the Prior Art

There exists a demand for a bread which can retain enhanced fragrant and crisp properties over time.

Current techniques for making bread from a paste or dough composed of water, flour, and yeast, may be reduced to the following cycle: dough is first made as homogeneous as possible through successive mechanical processing, allowed to leaven, cut into pieces providing a stock or blank which is fashioned into desired forms, after which, following as a rule further leavening, the bread forms are baked.

The structure of bread so made is generally characterized by a dense outer crust and a fine cellular underlayer and a soft elastic inner crumb of a more or less pronounced character which is unevenly distributed.

However, it is a well known fact that traditional bread undergoes, after a more or less short time period, a series of structural and organoleptic changes leading to its first becoming stale and then dry.

Bread crumb in particular is liable to undergo such structural alterations and progressively lose its elastic character to become coarse and abrasive, and therefore, unpalatable.

Other prior techniques for processing flour-based pastes or doughs yield bread-substitutive products, mainly crackers and bread sticks, which notoriously preserve well for a relatively long time.

It should be noted, however, that such substitutes have none of the fragrant and appetizing qualities of fresh bread.

Thus, such products fail to meet the above-mentioned demand.

The problem underlying this invention is, therefore, that of providing a novel breadmaking method whereby it becomes possible to produce on an industrial scale small loaves or buns which can retain all the characteristics of fresh bread over time, and specifically its flavor, fragrance, and crispness.

SUMMARY OF INVENTION

Broadly a solution for this problem is one of dealing with breadmaking dough, directly downstream of its preparation, to modify its chemical and physical state through violent mechanical treatments whereby baking will yield a loaf or bun the whole structure whereof is similar to the crust of traditional bread, being finely cellular and evenly distributed.

This solution is realized by a breadmaking method for producing crisp long term preservation small loaves or buns, which comprises the following process steps:

preparation of a breadmaking dough from high gluten content flour (proteins in excess of 12%) and water in amount lower than 40 bulk % based on flour bulk, and with the addition of yeast, rolling said dough until a breadmaking dough having visco-elastic characteristics is obtained, feeding a metered amount of said breadmaking dough into a mold cavity, the volume of said amount being substantially equal to the volume of said mold cavity, compressing said amount of breadmaking dough by direct action thereon until it fills by viscoelastic flowing said mold cavity substantially throughout, yielding a sheet-like compressed flat loaf blank, releasing the pressure on the flat sheet-like blank and shaking it out of the mold cavity, imparting said flat sheet-like blank with the final loaf shape, leavening the product from the preceding step, and baking the leavened product and drying it down to a lower moisture content of less than 10%.

While this method runs counter to traditional breadmaking techniques, which all observe a common criterion of avoiding, as far as possible, any violent mechanical handling of the breadmaking dough downstream of the rolling step in order to minimize disturbance of the leavening process, it has been found in actual practice that the resulting product was stable over time from both a chemical and physical standpoint and an organoleptic standpoint, and accordingly, adapted for long term storage without alteration of its initial properties of fragrance and crispness.

DETAILED DESCRIPTION OF THE PREFERRED EMBODIMENT

An illustrative and not limiting example will be described herein below of an application of the inventive method.

EXAMPLE 1

To prepare a breadmaking dough, the following ingredients were used:

100 kg flour having a protein content of about 13% by weight, which when analyzed by the Chopin Method, gave the following index values:

$W=260$, $P/L=0.5$;

35 kg water;

3 kg breadmaking yeast.

To the mixture were added 5 kg olive oil, sodium chloride, and malt in conventional dosages.

The kneading operation was conducted in two stages separated by a rest period of about 6 hours (two-stage dough).

The resulting dough was particularly consistent, and was then subjected to a series of successive rolling steps on a rolling machine until it yielded a homogeneous web of breadmaking dough strip (of the so-called "hard dough" type) exhibiting viscoelastic characteristerics and being 25 mm thick.

The breadmaking dough thus obtained has a specific density of 1.05 kg/dm$^3$.

The breadmaking dough strip was then fed into the nip of two parallel rollers driven rotatively at a peripheral velocity of 0.19 m/sec and held in tangential contact along a common generating line.

One of those rollers had plural molding cavities of triangular shape formed on its outer sleeve which have an average depth of 4 mm, the other roller having a smooth outer sleeve.

Dough would only be passed between the rollers where an empty mold is present directly upstream of the contact generating line therebetween.

It has been found that in going through the roller nip, the dough underwent a high and rapid compression causing it to flow viscoelastically to almost completely fill a respective molding cavity.

Downstream of the rollers, a compressed flat blank was obtained that was made easier to shake out of the mold cavity by the elastic recovery tendency of breadmaking dough.

The flat blank was then rolled up and allowed to leaven to a 45% swell by volume.

The leavened product was then baked at a temperature of about 250 to 270 degrees centigrade to yield a sample small loaf or bun of a rich brown color which was both consistent and crisp.

The sample loaf or bun was then dried to a moisture content of 5%, and on breaking, it showed a fine cellular and homogeneously dispersed structure.

20 days later, the sample loaves or buns so obtained showed no significant changes in consistency, flavor, fragrance, and crispness.

In the course of further tests, it was found that best results are to be obtained by using high gluten content flours (with a protein content of no less than 12%).

By way of non-limitative example, a system will be now described for producing crisp small loaves or buns on an industrial scale, which is particularly suitable to implement the inventive method.

A system for producing crisp small loaves or buns on an industrial scale comprises a kneading machine, a rolling machine, a forming machine, a leavening chamber, a baking oven, and a drier, in that order.

In the accompanying drawings, only the forming machine, comprehensively designated 1, is shown, the remaining machines being omitted because quite conventional.

The forming machine 1 comprises, in turn, a molding station 2, a wetting station 3, and a final forming station 4, in that order.

A breadmaking dough being processed will move through the above-mentioned machines in the order indicated.

Figures 2, 3:
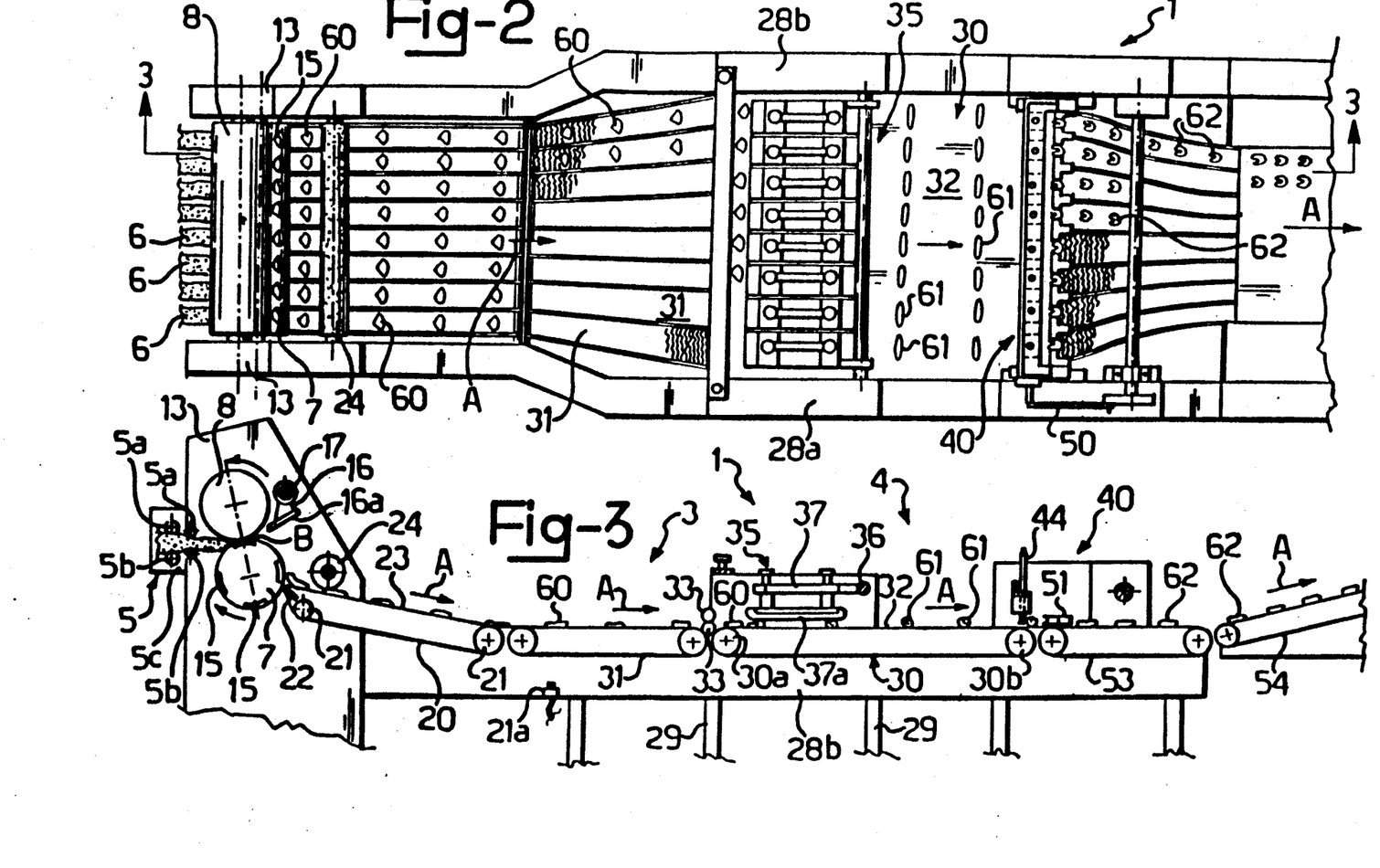
FIG. 2 is a top plan view of a portion of the breadmaking apparatus of FIG. 1.
FIG. 3 is a longitudinal section view taken along line 3—3 of FIG. 2.

The molding station 2 comprises a feeder assembly 5 composed of a frame 5c which carries rotatably a plurality of power driven roller roll pairs 5a, 5b with parallel axes.

A gap is defined between each roller pair 5a, 5b wherethrough a breadmaking dough 6 is made to pass.

The dough 6 reaches the feeder assembly 5 in the form of plural breadmaking dough strips (eight webs in the example shown) and goes sequentially through the nips of all the roller pairs 5a, 5b.

The size of said gap, for adjoining roller pairs, decreases in the direction of advance of the dough 6 as indicated by the arrow A.

Downstream of the feeder assembly 5, there are a pair of rollers, respectively a die roller 7 and a backup roller 8, lying parallel to each other and to the rolling rollers 5a, 5b and being driven counter-rotatingly by motors, not shown.

Figure 4:
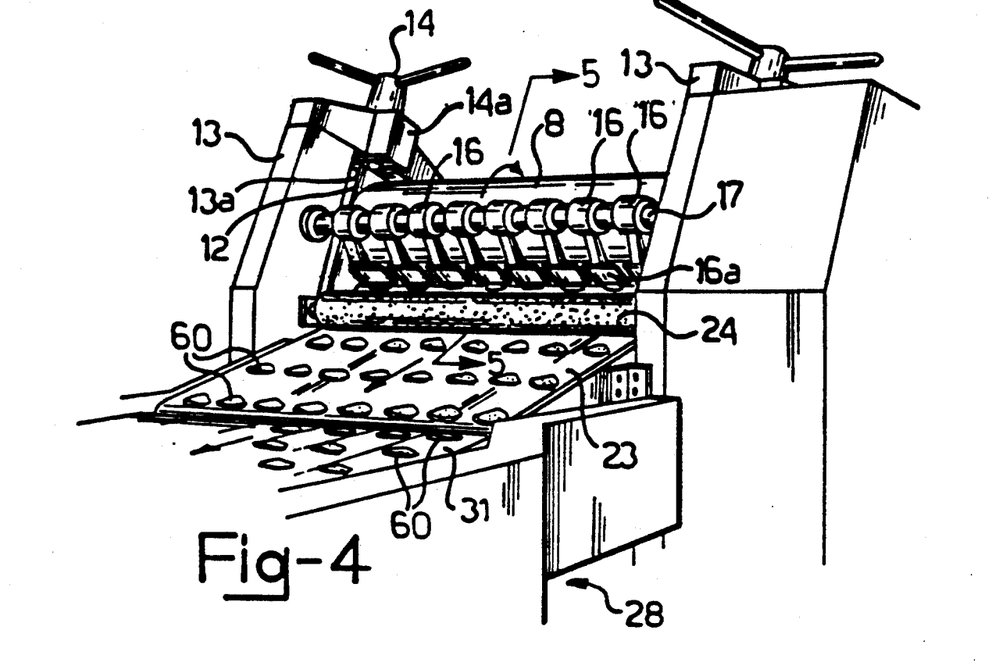
FIG. 4 is a fragmentary perspective view of a pressure molding station for compressed flat bun blanks and comprising a portion of the breadmaking apparatus of FIG. 1.

The rollers 7 and 8 are journalled on a pair of shoulders 13 of a framework 10 by means of respective seals 11 and 12.

The seals 12 are supported slidingly within respective seats 13a formed in the shoulders 13.

Respective screw adjusters or registers comprising a screw portion 14 and a nut portion 14a are mounted on each shoulder 13 and connected to their corresponding seal 12 to adjust its position relatively to the seal 11, and change, if desired, the distance between rollers 7 and 8.

The screw adjusters or registers 14, 14a form a means of positioning the roller 8 relatively to the roller 7; such means are essentially provided to position said rollers in mutual contact relationship along a common generating line B.

The roller 7 has a plurality of molding cavities 15, hereinafter referred to as the "molds", which are distributed regularly across its generating line segments. The number of the molds 15 which are aligned along any generating line of the roller 7 is equal to the number of the strips of dough 6 oncoming to the feeder assembly 5.

The molds 15 have substantially triangular shape with rounded off apexes, and have their bottoms partially coated with an adhesion-preventing material, such as an epoxy resin.

Figure 5:
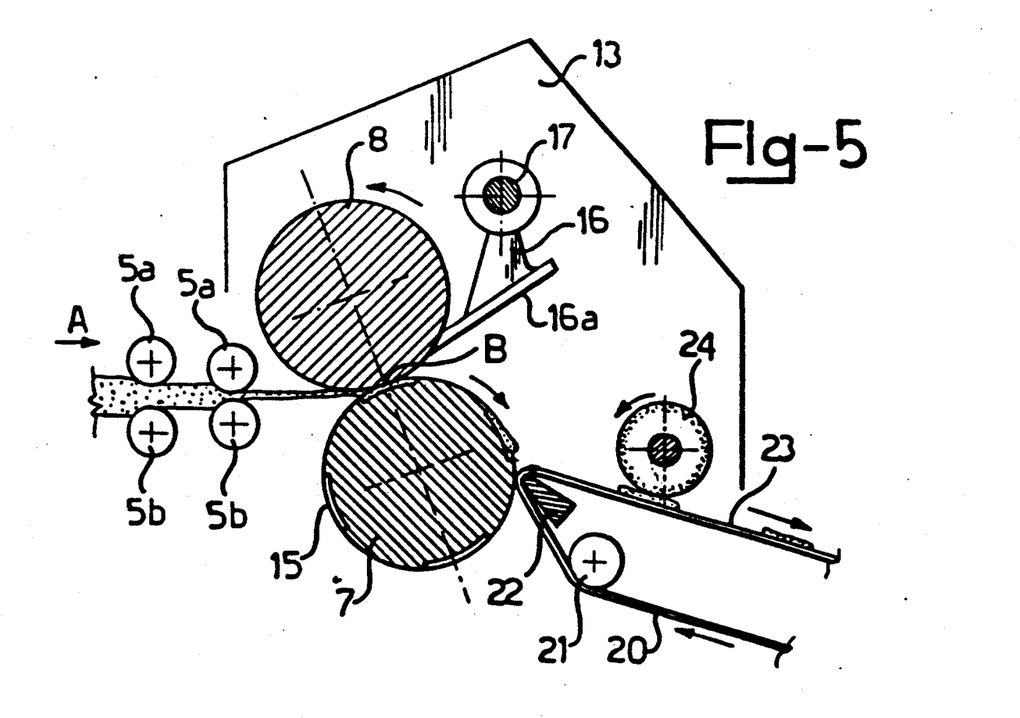
FIG. 5 is a section view taken along line 5—5 of FIG. 4.

The roller 8 has a smooth outer sleeve and doctoring members 16 are active thereon, one for each cylindrical segment of molds 15. The doctoring members 16 are carried on a shaft 17 which extends between the shoulders 13 and have a blend 16a set to the sleeve of the roller 8 directly downstream of the generating line B.

The molding station 2 further comprises a carpet conveyor 20 trained in a closed loop around respective rollers 21, and having one end held close to the roller 7 by a nose 22. The carpet 20 has a working conveying surface 23.

A levelling roller 24 is supported idly between the shoulders 13 downstream of the rollers 7, 8 and above the working surface 23; the roller 24 is rubber foam lined.

Figure 6:
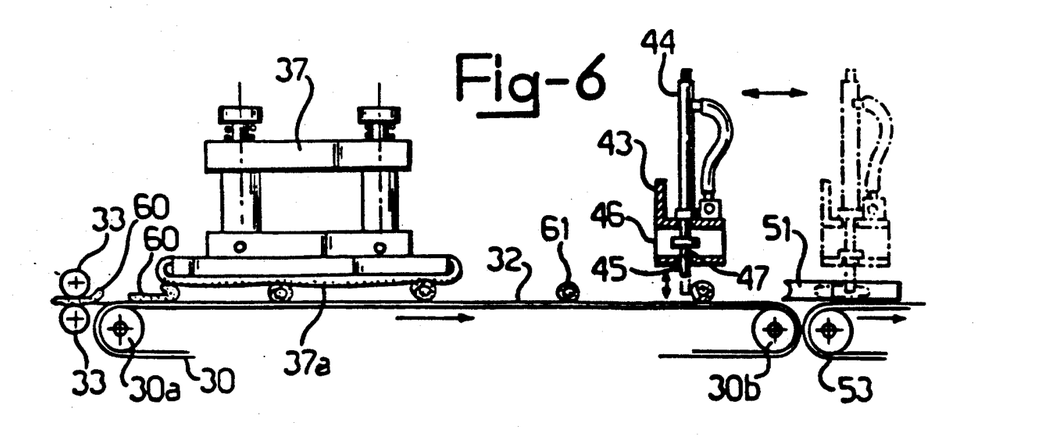
FIG. 6 is a diagrammatic elevational view, partly in section showing a loaf or bun forming station of the breadmaking apparatus of FIG. 1.

The wetting station 3 and final forming 4 stations are both carried on a frame 28 extending mainly in a longitudinal stringers or bars 28a and 28b which are provided, in turn, with legs 29. To the legs 29, at a region underlying the longitudinal stringers or bars 28a, 28b, there is also connected a pan 27 for collecting any scrap dough.

The wetting station 3 comprises, downstream of the carpet 20, a number of mesh conveyors 31 equal in number to molds 15 aligned along any generating line of the roller 7, and moving in the same direction as the carpet 20 and facing out in the direction of the arrow A.

The product travelling on the mesh conveyors 31 is subjected to water spray jets which are delivered at a preset rate from spray members indicated diagrammatically at 21a.

The final forming station 4 comprises a carpet conveyor 30 having a working area 32 on the same plane as the mesh conveyors 31.

The carpet 30 is stretched between rollers 30a and 30b journalled on the longitudinal stringers or bars 28a and 28b.

Between the mesh 31 and carpet 30 conveyors there intervene a pair of rollers 33, in parallel stacked relationship, which are powered and laid across the direction of advance of the product being processed (arrow A).

A gap is defined between the rollers 33 which has a set width to let said product being processed therethrough.

The rollers 33 are also journalled on the longitudinal stringers or bars 28a and 28b.

Directly downstream of the rollers 33, a portion of the working area 32 of the carpet conveyor 30 is acted upon by roll-up device 35.

The device 35 comprises a frame 36 extending across the direction (A) of advance of the product being processed and being fastened to the longitudinal stringers or bars 28a, 28b at a region overlying the carpet 30.

A plurality of clamps 37 extending vertically to the working area 32 of the carpet 30 are hooked on the frame 36 which are provided in the proximity of the working area with respective pads 37a of felt or the like comparatively soft material having a frictional coefficient.

The pads 37 are spring mounted to their respective clamps 37.

Figure 1:
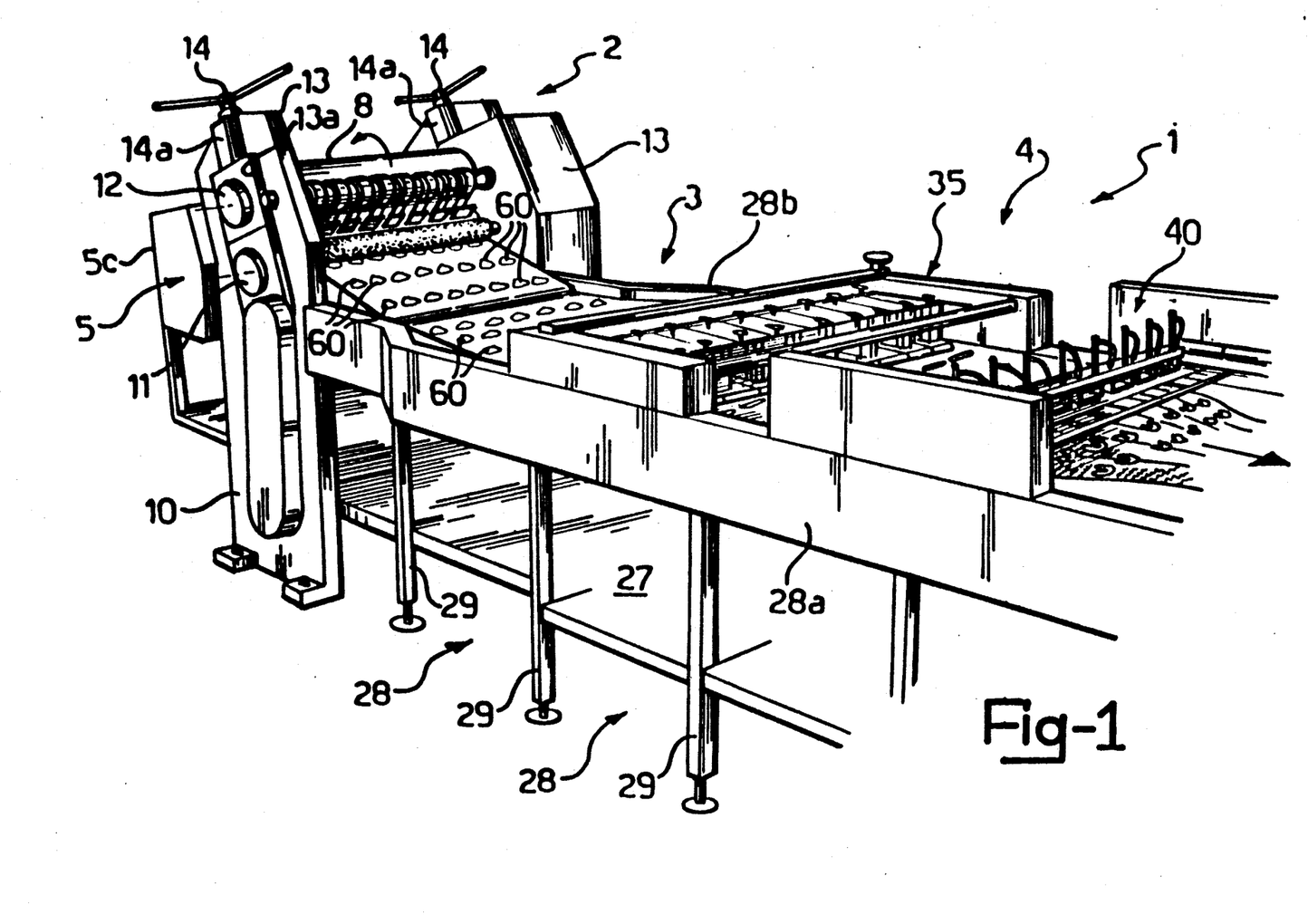
FIG. 1 is a fragmentary perspective view of an industrial breakmaking system for producing long term preservation crisp loaves or buns.

The station 4 further comprises a folding device 40 having a slide 41 movable along runways 42, in turn made fast with the longitudinal stringers or bars 28a, 28b.

Figure 7:
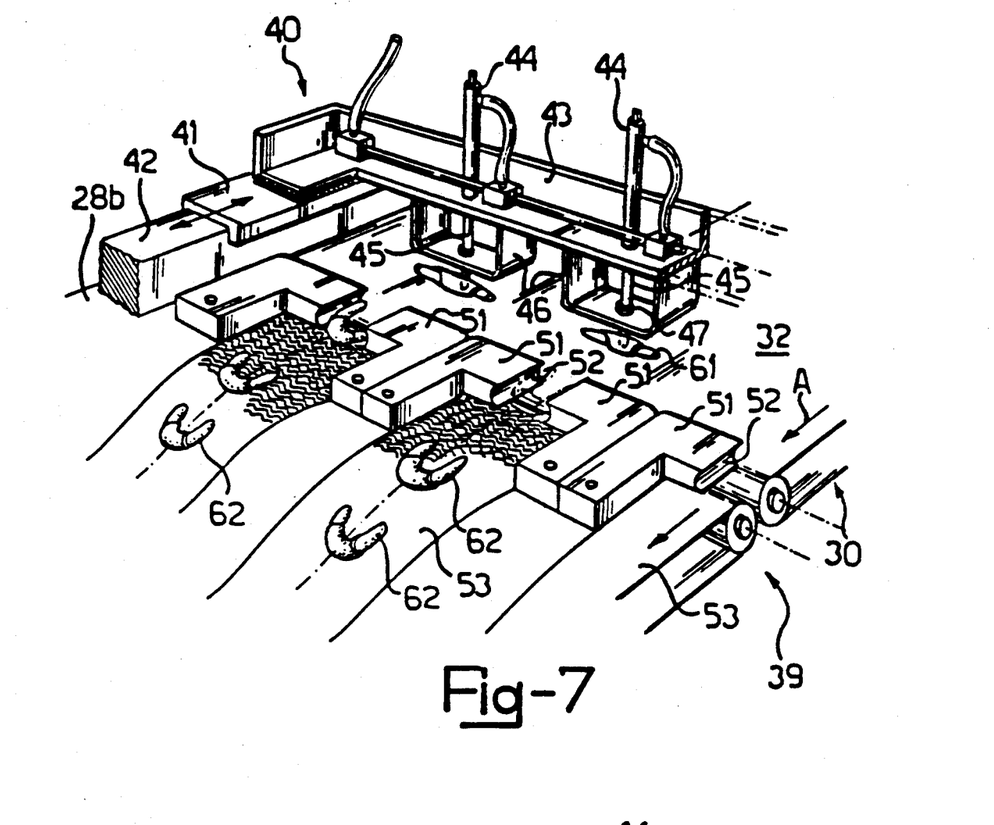
FIG. 7 is a detailed perspective view of one portion of the bun forming station of FIG. 6.

The slide 41 has a crosspiece 43 which extends bridge-fashion over the working area of the carpet conveyor 30. Mounted on the crosspiece 43 are a plurality of fluid-operated cylinders 44 each having a piston rod 45 which extends in a perpendicular direction to the working area 32 of the carpet 30 and a corresponding plurality of C-brackets 46 located between the crosspiece 43 and said working area 32. The brackets 46 have a bore 47 wherethrough the corresponding piston rod 45 is guided. Said brackets 46 are effective to prevent, with the piston rod 45 raised, the product being processed from sticking to the piston rod.

The slide 41 is reciprocated in a parallel direction to the arrow A by a connecting rod-crank lever type of linkage generally indicated at 50.

The piston rods 45 are drawn up, by respective cylinders 44 forming drive means therefor, to a raised position toward the crosspiece 43 each time that the movement of the slide 41 takes place in the opposite direction to the advancing product being processed, and are extended out, with their free ends brought close to the carpet 30 on said movement taking place in the same direction as the arrow A.

The piston rods 45 perform, therefore, with respect to the frame 28, a rectangular cycle movement in a perpendicular plane to the working area of the carpet 30 in parallel with the arrow A.

Of that cyclic movement, the travel path of the rods 45 down toward the carpet 30 will be referred to as the "active path".

The folding device 40 further comprises a corresponding plurality of pairs of juxtaposed templates 51, each pair delimiting a passageway located along the active path of the corresponding piston rod 45.

The template pairs 51 are mounted stationary on the frame 28 and have confronting surfaces 52 which are curved and concave in a symmetrical arrangement with respect to the plane wherein the corresponding piston rod moves.

Each template pair 51 overlies, over at least some distance, a corresponding conveyor belt 54 provided for transporting the product to the leavening chamber and then to the baking over.

The production steps for crisp small loaves or buns made with the inventive method will be now described in connection with the system just described.

The ingredients are kneaded in two stages, that is two distinct kneading sub-steps separated by a rest period, using high gluten content (protein content of about 13–14%) flour, water in the amount of about 35–37% bulk based on the dry flour, yeast, olive oil, malt, and salt bulk.

The resulting dough is subjected to sequential rolling passes until a homogeneous breakmaking dough sheet is obtained which has visco-elastic characteristics.

The dough sheet is then fed into a rolling machine where roller pairs will roll it into sheets of decreasing thickness.

The last roller pair in the rolling machine will split the rolled dough into plural strips 6, as shown in the drawings.

The breadmaking dough strips are then taken to the feeder assembly 5, wherein they undergo additional thickness reduction by rollers 5a, 5b.

For each dough strip there corresponds, as mentioned previously, one cylindrical segment having molds 15 in the die roller 7.

The speed of the roller pairs 5a, 5b is constant over time, and accordingly the amount of the dough which is being fed into the nip of the rollers 7 and 8 is also constant, while drawing of dough into any mold 15 of the roller 7 would be cyclic and dependent on an empty mold moving past the feeder 5.

Thus, each dough strip 6 upstream of the rollers 7 and 8 will be subjected to an intermittent forward movement at the same rate as the respective molds 15 moving past.

During the wait for fresh empty mold 15, the dough 6 undergoes a consequent slight build-up upstream of the rollers 7, 8.

When a mold 15 is present directly upstream of the generating line B of contact of the rollers 7, 8, the dough build-up will be drawn into it in a volume approximately equal to the volume of the mold 15 cavity.

The dough is forced to flow visco-elastically to almost completely fill the cavity of the mold 15 while contributing, on account of its consistency and toughness, a significant elastic reaction force, to deliver, downstream of the generating line B and for each mold 15, a compressed flat blank 60.

By way of illustration, it has been found that rollers 7, 8 820 mm long and having an outside diameter of 270 mm, with eight mold cavities 15 aligned on one generating line, are subjected in operation to a load in the region of 15 to 30 tons.

The blanks 60 undergo, directly downstream of the generating line B, a slight amount of elastic recovery which results in their becoming detached from the respective molds.

Any blanks 60 sticking to the backup roller 8 would be removed therefrom by doctoring means 16.

The blanks 60 are then load onto the carpet conveyor 20 and rolled out thereover by the levelling roller 24.

They are wetted in going through the station 3 in a manner already described previously, and subjected to further rolling through the nip of the rollers 33.

Downstream of the rollers 33, each blank will have a leading portion (in the direction of the arrow A) which curls slightly upward to invite subsequent rolling up at the device 35.

In moving underneath the flat pads 37a, the blanks 60 entrained by the carpet 30 are rolled up into a substantially cylindrical configuration indicated at 61 in the drawings.

The cylindrical blanks 61 are taken forward by the carpet 30 toward the templates 51 of the folding device 40.

Directly upstream of the templates 51, each blank 61 will be reached by the piston rod 45 of its corresponding fluid-operated cylinder 44, taken by the slide 41 in the opposite direction to the advancing direction of the carpet 30. Each piston rod 45 is lowered onto the carpet 30 directly upstream of a corresponding blank 61 and follows it in its path of travel up to the templates 51, to force it through the gap between the confronting surface 52 of the latter.

Thus, the blanks 61 will be bent into a crescent-like shape as indicated at 62 in the drawing.

From the templates 51 they are then discharge onto the belt conveyors 53, and whence onto the carpet conveyor 54, to be taken to a leavening chamber where they are allowed to stand at a temperature of 36° C. for about one hour, their volume increasing by 45%.

The leavened blanks are then baked at a temperature in the 250° to 270° C. range.

On leaving the oven, they are dried until their moisture content drops to about 5%, and then packaged into bags, boxes, or other appropriate commercial packaging containers.

We claim:

1. A system for producing crisp, long term preservation, small loaves on an industrial scale, comprising:
   a forming machine having a feeder assembly, a molding station and a forming station laid sequentially to each other, said feeder assembly including a plurality of parallel, sequentially-laid driven feeder roll pairs, a gap between corresponding feeder roll pairs decreasing in width from the most upstream feeder roll pair to the most downstream feeder roll pair, said molding station including first and second counter-rotating driven rolls journalled on a framework with their axes parallel, said first roll having a plurality of mold cavities uniformly distributed across its skirt, said second roll having a smooth surface skirt;
   said first and second rolls being mounted in pressure contact with each other along a common generatrix line;
   said forming station comprising a frame carrying a carpet conveyor mounted thereto, and a folder device supported on said frame over a working run of said carpet conveyor, said folder device including a slide guided on said frame in a parallel direction to the working run of said carpet conveyor, a crosspiece fast with said slide and extending bridge-like over the working run of said carpet conveyor, a plurality of rods supported to move at least in a plane on said crosspiece and extending perpendicularly to the working run, drive means for reciprocating said rods toward and away from the working run, and a corresponding plurality of template pairs attached to said frame on the working run, the templates in each pair being laid symmetrically with respect to the plane of movement of a respective one of said rods and mutually set apart from the plane to delimit a passageway for said rod therebetween, whereby to fold loaves, said one of said rods forces loaves through the passageway.

2. A system according to claim 1, wherein said mold cavities are at least partly coated with an adhesion-preventing material.

3. A system according to claim 2, wherein said adhesion-preventing material is an epoxy resin.

4. A system according to claim 1, wherein the mold cavities have a triangular shape and a depth of about 4 mm.

5. A system according to claim 1, wherein said rods are each incorporated to a corresponding fluid-operated cylinder mounted on said crosspiece and forming a drive member for the respective rod.

6. A system according to claim 1, further comprising, for each rod, a clamp rigid with said crosspiece on the side next to said conveyor, each clamp being formed with a respective bore wherethrough a corresponding rod is made to pass.

7. A system according to claim 1, wherein said templates have concave curved confronting surfaces.

8. A system according to claim 1, further comprising means for feeding plural, substantially parallel, break-making dough strips to said feeder assembly, wherein said plurality of uniformly distributed mold cavities are arranged in correspondence with the plural dough strips.

9. A system according to claim 1, further comprising means for driving said feeder roll pairs and said first and second rolls at a constant relative speed such that the volume of dough fed by said feeder roll pairs to said plurality of mold cavities is substantially equal to the volume of said cavities.

10. A system according to claim 1, further comprising means for pressing said first and second rolls together under a predetermined pressure whereby dough fed to said first and second rolls is subjected to visco-elastic compression.

* * * * *

UNITED STATES PATENT AND TRADEMARK OFFICE
CERTIFICATE OF CORRECTION

PATENT NO. : 5,143,735

DATED : September 1, 1992

INVENTOR(S) : ANGELO VARVELLO ET AL.

It is certified that error appears in the above-identified patent and that said Letters Patent is hereby corrected as shown below:

Title page, item [56] REFERENCES CITED

Foregin Patent Documents,
        "4527384  7/1966  Japan" should read
        --45-27384  9/1966  Japan--.

U.S. Patent Documents,
        "Rize" should read --Rice-- and
        "Warner" should read --Werner--.

COLUMN 1

Line 33, "well known" should read --well-known--.
    Line 59, "Broadly" should read --Broadly,--.

COLUMN 2

Line 35, "breakmaking" should read --breadmaking--.
    Line 48, "section" should read --section,--.
    Line 58, "herein below" should read --hereinbelow--.

COLUMN 3

Line 56, "drier," should read --dryer,--.

COLUMN 4

Line 1, "roll" should be deleted.
    Line 2, "axes." should read --axes (FIGS. 2 and 3).--.
    Line 19, "12." should read --12 (FIG. 4).--.
    Line 40, "rounded off" should read --rounded-off--.
    Line 59, "4 stations" should read --stations 4--.

UNITED STATES PATENT AND TRADEMARK OFFICE
CERTIFICATE OF CORRECTION

PATENT NO. : 5,143,735
DATED : September 1, 1992
INVENTOR(S) : ANGELO VARVELLO ET AL.

It is certified that error appears in the above-identified patent and that said Letters Patent is hereby corrected as shown below:

COLUMN 5

Line 2, "facing" should read --fanning--.
Line 36, "pads 37" should read --pads 37a--.
Line 38, "device 40" should read --device 40 (FIG. 1)--.

COLUMN 6

Line 16, "over." should read --oven.--.
Line 27, "breakmaking" should read --breadmaking--.

COLUMN 7

Line 7, "load" should read --laid--.
Line 34, "discharge" should read --discharged--.

COLUMN 8

Line 30, "the" should read --said--.
Line 45, "break-" should read --bread- --.

Signed and Sealed this

Ninth Day of November, 1993

Attest:

BRUCE LEHMAN

Attesting Officer       Commissioner of Patents and Trademarks